United States Patent [19]

Osswald et al.

[11] 3,963,510

[45] June 15, 1976

[54] PROCESS FOR THE PRODUCTION OF TONED CARBON BLACK

[75] Inventors: Günter Osswald, Grossauheim; Josef Reus, Freigericht, both of Germany

[73] Assignee: Deutsche Gold- und Silber-Scheideanstalt vormals Roessler, Germany

[22] Filed: Nov. 1, 1974

[21] Appl. No.: 520,224

[30] Foreign Application Priority Data

Nov. 8, 1973 Germany............................ 2355758

[52] U.S. Cl............................... 106/289; 106/307
[51] Int. Cl.².......................... C09C 1/48; C09C 1/44
[58] Field of Search............................ 106/289, 307

[56] References Cited
UNITED STATES PATENTS 1,921,857  8/1933  Zschimmer..................... 106/289 X
2,785,079  3/1957  Voet.............................. 106/307 X

FOREIGN PATENTS OR APPLICATIONS 267,625  3/1927  United Kingdom............. 106/289 X
1,354  5/1863  United Kingdom................. 106/289

Primary Examiner—Patrick P. Garvin
Assistant Examiner—William G. Wright
Attorney, Agent, or Firm—Cushman, Darby & Cushman

[57] ABSTRACT

Carbon black toned with lake forming organic dyes are produced by dispersing the carbon black in an aqueous solution of the dye and the laking agent, for example aluminum sulfate, the dispersion subsequently mixed with stirring with the lake forming agent sodium water glass, the laking being then completed by adding sodium molybdate and the toned carbon black dried after separation of the liquid phase.

14 Claims, No Drawings

PROCESS FOR THE PRODUCTION OF TONED CARBON BLACK

The invention is directed to a process for the production of carbon black toned with lake forming organic dyes and the resulting products.

Carbon blacks frequently have an undesired brown under tone which can only be compensated for by admixing toning dyes (organic pigments). In the production of black printing inks and waxless carbon paper previously the carbon black and a blue toning pigment have been separately worked into the formulation. In order to obtain good flowing dye dispersions, the necessary portion must be relatively high which injures the sharpness of the carbon copies in waxless carbon paper. In printing inks, the at least partial solubility of the customarily used toning dyes produces in the organic solvent added as diluent an undesired tendency of the pigment to bleed.

The invention is based on the problem of avoiding this disadvantage by creating a carbon black toned with lake forming organic dyes by a new method of production.

The manufacturing process of the invention consists of dispersing the carbon black in an aqueous solution of the dye and the laking agent, for example aluminum sulfate, subsequently mixing the dispersion with stirring with the lake forming reagent sodium water glass (sodium silicate), the laking being then completed by adding sodium molybdate and the toned carbon black dried after separation of the liquid phase. Especially good results are obtained if the dispersion is held at a temperature above 50°C., preferably 65°–85°C. during the laking reaction. The reaction, however, can be carried out at a temperature from room temperature (about 20°C.) to the boiling point.

The process thus makes possible the inner union of carbon black with a water soluble dye to form a pigment preparation with help of an inorganic laking agent. It was assumed that thereby the dye is linked to the carbon black by way of the laking agent and thereby made water insoluble. Simultaneously, the solubility of the dye in organic solvents is lowered. Thereby the bleeding appearance of the dye is reduced.

Through the lower oil requirement which is possessed by the toned carbon black in comparison to untoned carbon black, by few better flowing carbon black oil dispersions are produced. In using the pigment preparations in waxless carbon papers, sharp carbon papers are produced.

An explanation of the advantageous properties is seen in that in the manufacturing method of the invention a solid linked particle is formed while in the previously customary separate working in the black and blue pigments are present together separately and can be mutually injuriously influenced.

The lake forming organic dyes are normally of the blue (including violet) type. Thus there can be employed methyl violet, crystal violet, Victoria blue, FD and C Blue No. 1 and FD and C Blue No. 2 (see Kirk Othmer "Encyclopedia of Chemical Technology", 1st edition, Vol. 4, page 294). The organic dyes employed are usually triphenyl methane dyes but there can also be employed other lake forming dyes, e.g., lake forming indigo dyes, lake forming azo dyes, etc.

The heavy metal for forming the lakes is preferably aluminum but there can be used other heavy metals which are conventionally employed such as antimony, bismuth and zirconium. The heavy metals can be employed in conventional manner as water soluble salts such as aluminum sulfate, aluminum chloride, aluminum nitrate, bismuth, antimony, chloride, zirconium nitrate.

The range of dye to carbon black is not especially critical. It may range for example from 1 to 20 parts by weight of dye per 100 parts of carbon black.

The invention is additionally directed to the products obtained and their use in lacquer and printing ink systems as well as to waxless carbon papers and other products.

The invention will be further explained in the following examples.

Unless otherwise indicated, all parts and percentages are by weight.

EXAMPLE 1

| | |
|---|---|
| Special black (a gas black) | 100 parts |
| Methyl violet | 9 |
| Aluminum sulfate | 20 |

The above materials were dispersed in 1000 parts of water in a Dissolver (a mixer having a powerful stirrer). There were slowly dropped into the dispersion obtained 80 parts of sodium waterglass (35% aqueous sodium silicate solution). Subsequently, there were added 2 parts of sodium molybdate in 98 parts of water. After approximately 2 hours, the reaction was ended. During the entire procesure, the temperature was maintained at 70° to 80°C. and the reaction medium was strongly stirred.

After filtering off and washing the product was dried for 20 hours at 90°C. in a drying chest.

The properties of the preparation were as follows: Low oil requirement, good flow properties in binders, blue-violet color stain, very low inclination for bleeding of the dye in esters, ketones, hydrocarbons and chlorinated hydrocarbons.

In the following examples the preparation was produced by the reaction process described in Example 1.

EXAMPLE 2

| | | |
|---|---|---|
| Special black 4 | 100 | parts |
| Crystal violet | 10 | |
| Aluminum sulfate | 20 | |
| Water | 1000 | |
| Sodium waterglass (35% in water) | 80 | |
| Sodium molybdate | 2 | (in 98 parts of water) |

The properties of the product was the same as those in Example 1 except for somewhat better color stain, somewhat better dispersibility in binders.

EXAMPLE 3

| | | |
|---|---|---|
| Special black 4 | 100 | |
| Victoria blue | 10 | |
| Aluminum sulfate | 20 | |
| Water | 1000 | |
| Sodium waterglass (35% in water) | 80 | |
| Sodium molybdate | 2 | (in 98 parts of water) |

The properties of the preparation were the same as in Example 1 except for a bluer color stain.

EXAMPLE 4

| | |
|---|---|
| Special black 15 (furnace black) | 100 parts |
| Methyl violet | 9 |
| Aluminum sulfate | 20 |
| Water | 1000 |
| Sodium waterglass (35% in water) | 80 |
| Sodium molybdate | 2 (in 98 parts of water) |

The properties of the preparation were the same as in Example 1 except for a somewhat lower oil requirement.

The process can comprise, consist essentially of or consist of the steps set forth. Likewise the product can comprise, consist essentially of or consist of the materials set forth. Preferably the process and product consist essentially of the conditions and compositions recited.

What is claimed is:

1. A process for the production of carbon black toned with a lake forming organic dye comprising dispersing the carbon black in an aqueous solution of the dye and the laking agent, mixing the dispersion obtained with stirring with sodium waterglass, completing the laking by adding sodium molybdate, separating the toned carbon black from the liquid phase and drying the toned carbon black.

2. The process of claim 1 wherein the laking agent is a water soluble salt of a heavy metal.

3. The process of claim 2 wherein the salt is an aluminum salt.

4. The process of claim 3 wherein the salt is aluminum sulfate.

5. The process of claim 4 wherein the process is carried out at 65° to 85°C.

6. The process of claim 1 wherein the process is carried out at a temperature of at least 50°C.

7. The process of claim 1 wherein the organic dye is triphenylmethane dye.

8. The process according to claim 7 wherein the dye is a blue dye.

9. The process of claim 8 wherein the dye is methyl violet, crystal violet or Victoria blue.

10. The process of claim 9 wherein the laking agent is a water soluble aluminum salt.

11. The process of claim 10 wherein the aluminum salt is aluminum sulfate and the process is carried out at a temperature of 50° to 85°C.

12. The process of claim 1 wherein there are present 1 to 20 parts by weight of dye per 100 parts by weight of carbon black.

13. The process of claim 12 wherein there are employed 20 parts by weight of aluminum sulfate per 100 parts by weight of carbon black.

14. The process of claim 13 wherein there are employed 2 parts by weight of sodium molybdate and 80 parts by weight of 35% sodium waterglass per 100 parts by weight of carbon black.

* * * * *